United States Patent [19]
Smith et al.

[11] Patent Number: 5,729,452
[45] Date of Patent: Mar. 17, 1998

[54] METHOD AND SYSTEM FOR DIAGNOSING AND REPORTING FAILURE OF A VEHICLE EMISSION TEST

[75] Inventors: Mary V. Smith, San Antonio, Tex.;
Mark D. Frost, Piedmont, Calif.

[73] Assignee: Envirotest Acquisition Co., Sunnyvale, Calif.

[21] Appl. No.: 414,925

[22] Filed: Mar. 31, 1995

[51] Int. Cl.⁶ ............................................. G06F 7/06
[52] U.S. Cl. .............................. 364/424.03; 364/551.01; 364/151; 395/600
[58] Field of Search ................... 364/424.03, 424.02, 364/550.1, 552, 570, 571.01, 574.04, 579, 581, 148, 149, 151, 152; 395/10, 20, 23, 165, 905, 913, 161, 600

[56] References Cited

U.S. PATENT DOCUMENTS

| | | | |
|---|---|---|---|
| 4,175,427 | 11/1979 | Blanke | 73/118 |
| 4,404,639 | 9/1983 | McGuire et al. | 364/551 |
| 4,796,206 | 1/1989 | Boscove et al. | 364/551.01 |
| 4,924,095 | 5/1990 | Swanson, Jr. | 250/338.5 |
| 5,099,437 | 3/1992 | Weber | 364/550 |
| 5,229,942 | 7/1993 | Nicholson et al. | 364/424.03 |
| 5,272,769 | 12/1993 | Strnatka et al. | 395/161 |
| 5,414,626 | 5/1995 | Boorse et al. | 364/424.03 |
| 5,432,904 | 7/1995 | Wong | 395/161 |
| 5,479,359 | 12/1995 | Rogero et al. | 364/496 |

*Primary Examiner*—Kevin J. Teska
*Assistant Examiner*—Tan Nguyen
*Attorney, Agent, or Firm*—Paula N. Chavez

[57] ABSTRACT

A system and method which systematically diagnoses emissions test failure by applying the rules of a knowledge base to predict the cause of vehicle emissions failures. Classifiers are used to form predictions. The classifier is the data structure used in the automobile emission testing inspection lane by the lane diagnostic subsystem to provide a diagnosis for a particular vehicle. Its output is the likelihood that a vehicle suffers from a given failure based on the values of characteristics such as its emissions test results and the vehicle's description. The classifier predictions are then used to prepare a failure report that is given to the motorist for use by his or her repair technician. In another feature of this invention, the classifiers are continuously updated in a learning process based on new repair records. The learning processes periodically analyzes the data and updates the knowledge base to include new or revised classifiers.

18 Claims, 7 Drawing Sheets

FIG. 3a
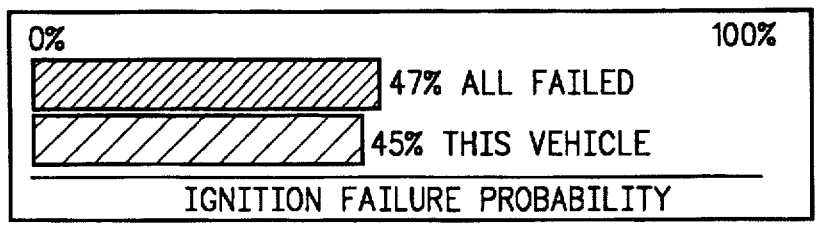
FIG. 3b
| Ignition Failure Symptoms |
|---|
| IDLE HC in [346,786] |
| IDLE CO > 1.27 |
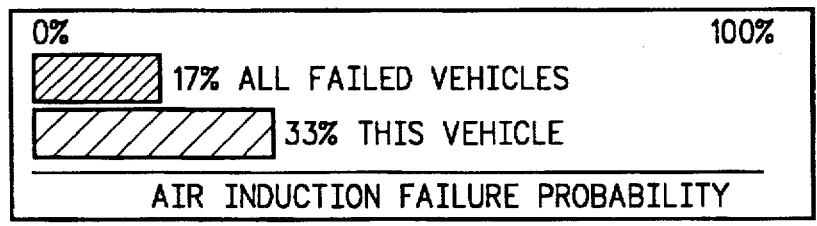
FIG. 3c
| Air Induction Failure Symptoms |
|---|
| MODEL YEAR in [76,91] |
| IDLE O2 > = 4.9 |
| IDLE HC > = 346 |
FIG. 3d

METHOD AND SYSTEM FOR DIAGNOSING AND REPORTING FAILURE OF A VEHICLE EMISSION TEST

FIELD OF THE PRESENT INVENTION

This invention relates to automobile emissions testing and more particularly to a system and method for predicting the cause of an automobile's failure of an emissions test.

BACKGROUND OF THE INVENTION

In geographical locations having poor air quality, the United States federal government has mandated vehicle emission inspection and maintenance (I/M) programs in an effort to enforce emission limit laws on automobile owners. The objective of these programs is to identify vehicles whose emissions controls systems no longer perform acceptably and require those vehicles to receive the necessary repairs and/or maintenance. The owner of a car which is within the allowable limits is presented with a certificate of compliance. However, an owner of a car which is not within the allowable limits must repair the automobile so that its emissions are within the allowable levels.

Because of the federal mandate, approximately 34 million vehicles are tested annually. However, nearly 8.1 million fail the test and must be repaired. It is estimated that $975 million dollars are spent in parts and service sales in repairing vehicles to bring them into compliance with federal emission standards.

A vehicle owner presented with a non-compliance report typically will engage an automobile repair service provider to bring the vehicle into compliance. However, because of the number of different types of vehicles and models, it often difficult for an independent repair service provider to reliably determine the cause of failure. For example, in one state inspection program a sample of 10,450 initial inspection failures lead to 4,400 re-inspection failures, such indicating a forty-two (42%) failure to repair. The retest failure of forty-two percent 42% of 8.1 million failed vehicles is equivalent to 3.4 million that must be repaired further and tested a third time or deemed eligible for a waiver if the repair costs of that particular vehicle exceeded statutory limits.

The cost to vehicle owners for unsuccessful repairs as well as to the air quality for continued excessive emissions is very high. Moreover, even in automobiles which are able to pass, oftentimes their reported emission measurements are close to the limits allowable by law and thus could benefit from lowering. It would be beneficial for the vehicle's regular service technician to service the car in a manner which he or she knowingly could improve emission levels in such a case. Thus, it would be beneficial if a testing facility were able to provide an analysis of causes of emissions that are either close to or over legal limits at the same time the vehicle owner is presented with a emissions test report.

In some states, hot-lines exist for automobile repair service providers to call for help in diagnosing test failure results. Experts talk with service providers to brainstorm a solution to the emission problem. However, with each vehicle, there are many variables to consider, including multiple emissions category failures. Therefore, it is desirable to systematically diagnose failure to provide a relatively reliable and accurate prediction of the type of repair which would bring the vehicle into compliance with emission laws. Moreover, it would be beneficial to provide the automobile owner with a prediction prior to bringing the vehicle to a repair technician for evaluation.

SUMMARY OF THE INVENTION

This invention includes the preparation of a diagnostic report with a diagnostic assessment for a vehicle owner to use in repairing his or her vehicle to bring its emissions into compliance with emission standards. The diagnostic assessment gives the vehicle owner's service technician probabilistic information about the likely causes of the vehicle's failure of the emissions test. The diagnosis is derived from operations involving a classifier table which stores previously derived rules which form the basis for the prediction of the diagnostic assessment. If a vehicle which previously failed the emission test finally passes, information relating to the passing test is used to update the classifier table.

More particularly, a classifier of the classifier table is the data structure used in the automobile emission testing inspection lane by the lane diagnostic subsystem, which runs on the lane controller computer, to provide a diagnosis for a particular vehicle. It allows a quick evaluation of the likelihood that a vehicle suffers from a given failure based on the values of characteristics such as its emissions test results and the vehicle's description.

The classifier predictions are then used to prepare a failure report that is given to the motorist for use by his or her repair technician. The diagnosis reached by the system will be uploaded and stored on a central database server computer for purposes of reporting, correlation with actual repair, and inclusion in the knowledge base.

In another feature of this invention, the classifiers are continuously updated in a learning process based on new repair records. The learning process periodically analyzes the repair data and updates the knowledge base to include new or revised classifiers. The learning process will explore, identify and predict failures that correlate with parameter such as the following: vehicle make and model year; vehicle milage; on-board-diagnostics (OBD) data; emissions composite values; and emissions second-by-second values.

The learning process can be described in terms of its inputs, outputs and functions. The inputs to the learning process utility are suitably prepared data from the following: vehicle test records; vehicle emissions repair records; and diagnostic records. The outputs to the learning process utility are for example: new classifiers; learning process log entry; administrative report; and a pattern report. The general functions of the learning process are to describe the data, determine patterns of significance, and create a classification data structure (classifier) and mechanisms for applying the classifier in a predictive mode. The predictive accuracy of the classifier is evaluated periodically using a dataset representative of current program vehicles. The classifier is updated as needed to maintain or improve accuracy.

BRIEF DESCRIPTION OF THE DRAWINGS

FIGS. 3a–3d show an example of a prediction report;

FIG. 4a is a diagram of the method of this invention;

FIG. 4b is a legend of the diagram of FIG. 4a;

DETAILED DESCRIPTION OF THE INVENTION

This description is broken down into three distinct sections. The first section describes the emissions testing process in general with reference to the initial diagnostic assessment feature of the this invention. The second section describes the learning process feature of the this invention which uses among other things, data emissions testing information generated from retests of previously failed vehicles to update the classifiers used to make initial diagnostic assessment. The third section ties the elements of the first section and the second section together with reference to the interaction of this invention with the operations of an inspection lane.

Figure 1:
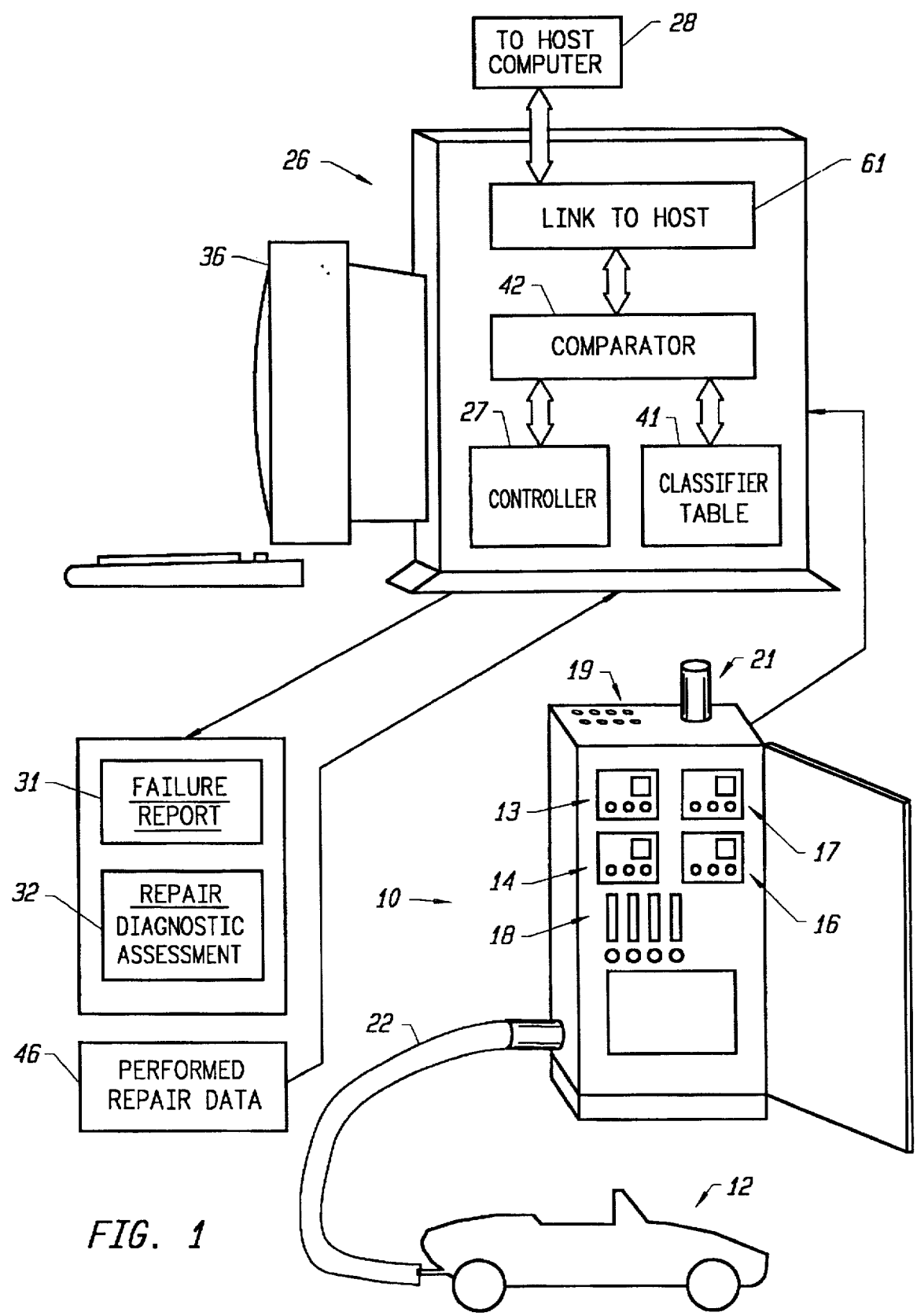
FIG. 1 depicts hardware elements of the this invention.
Figure 2B:
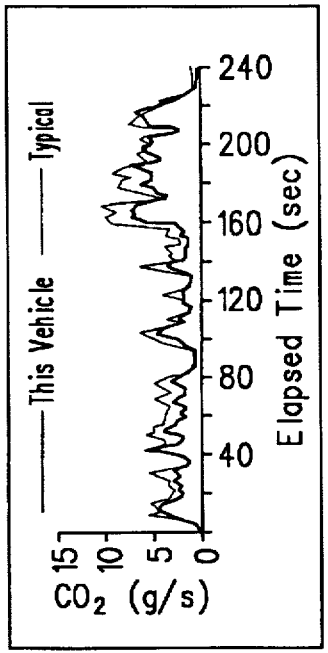
FIGS. 2a–2f are graphs of emissions and purge test results.
Figure 2D:
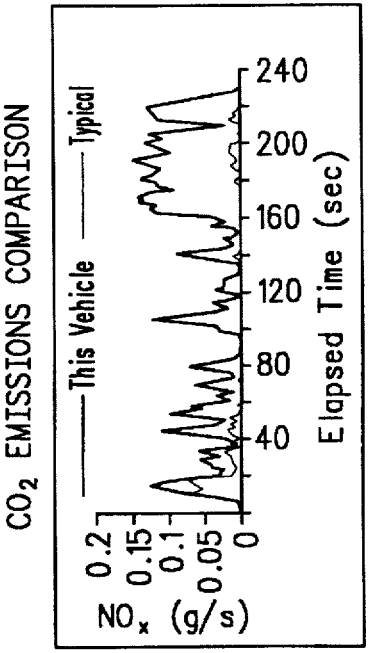
Figure 2F:
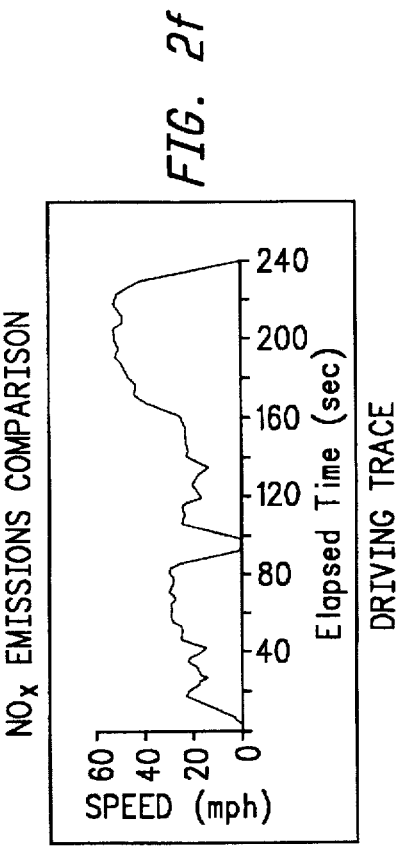
Figure 2A:
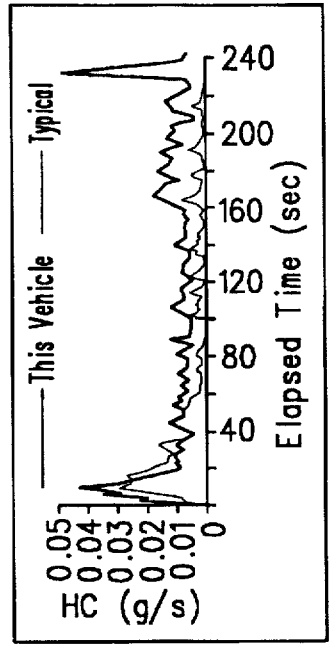
Figure 2C:
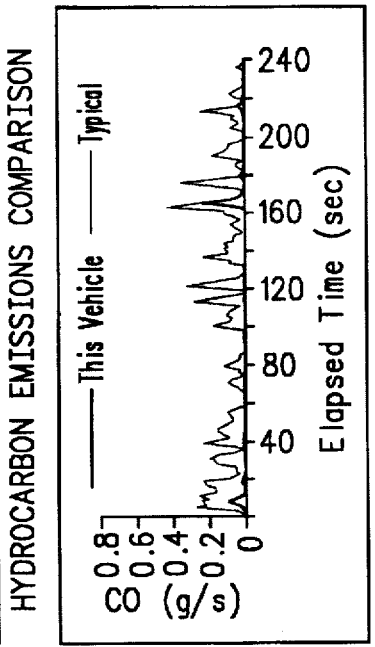
Figure 2E:
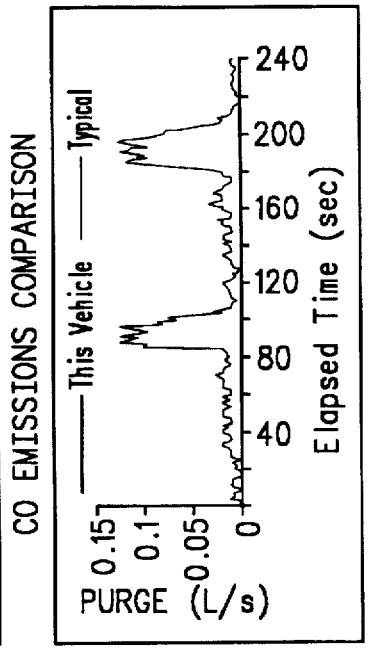

As an introduction, the following is a discussion about the features of an emissions inspection system. Generally, any of a number vehicle emissions testing regimes (or procedures) can be used and this invention is not limited to any one of them. Examples include, two-speed idle, loaded steady-state, ASM 50-15, ASM 25-25, ASM 2, and I/M 240. I/M 240 will be used as an example of to illustrate aspects of the data collection feature invention. As mentioned above, the I/M refers to inspection maintenance. The 240 of I/M 240 refers to the 240 seconds in which data is collected. Other emissions test systems are equally applicable. FIG. 1 shows a system which is used to test for certain emissions during the I/M 240 test. The emission analysis system 10 uses a tube 22 to collect exhaust from the tailpipe of automobile 12 to test for HC, CO, $CO_2$, and $NO_x$, read by analyzers 13, 14, 16 and 17 (or what ever emissions collection is desired). Emission analysis system 10 also includes other typical features such as flowmeters 18, calibration gases 19, an exhaust pipe to the roof 21.

As is true with all test regimes, the I/M 240 emissions analyzer system is controlled by a software/hardware combination and is in communication with the lane controller processor 26. During the I/M 240 driving cycle, the I/M 240 emissions analyzer system transmits mass emissions data to a processor at a once-per-second rate. Each grams-per-second reading time-stamped and transmitted to the processor, which calculates the resultant second-by-second grams-per-mile results. Each grams-per-second results also includes a status byte that flags systems failures, out-of-range conditions, and communications errors so that the processor can be signalled to take immediate action.

The processor 26 performs all of the described functions and is usually in communication with a central data base server host processor 28. Usually, the testing facility runs several test lanes. In other situations, the test facility operates a single emission analysis system 10. Each lane is equipped with a processor 26 which supports the execution of controller software 27 which manages the activities in the lane including the storage of the emissions data. Then, using the proper weighting factors, it calculates the total values, which are compared to the appropriate I/M 240 (or other test regimes) exhaust standards to determine pass or fail.

The processor 26 generates a failure report 31 indicating that the vehicle has exceeded the legal limit of one or more chemical emissions. Turning to FIG. 2, illustrates the contents of the failure report 31, that is the raw data generated from the emission test, of FIG. 1 to give the vehicle owner information about the levels of emissions with respect to the allowable limits set by law. The failure report is delivered in any format, for example, written or electronic.

In the system of the this invention, the processor 26, provides a diagnostic assessment 32. In a first situation, the diagnostic assessment is provided in the event of a failure of a vehicle to pass emissions test.

At the start of the vehicle inspection where a vehicle is being retested, vehicle inspection personnel either enters repair data 46 to processor 26 or it is scanned in and up to the host data base server 28 for input using various other means. Since the vehicle has failed a previous test, that is this current test is a retest, the performed repair data 46 is surrendered and is entered at an appropriate time.

A repair data form scanning system that completely automates the task of reading and evaluation the information collected from vehicle repair reports is preferred. In a situation where the inspection personnel enters the data the console display 36 provides prompts and messages to the inspector and permits entry of responses and data. Preferably, data entered into the system is thoroughly checked for errors before being accepted.

Controller software 27 causes the emissions data or similar data shown in FIGS. 2a–2f to be formatted in a manner so that it can be compared to the classifiers stored in classifier table 41. Comparator 42 runs an algorithm so that processor 26 generates diagnostic assessment 32 for an individual vehicle.

The algorithm to evaluate each vehicle using the classifier table is preferably computationally economical. The classifier is a set of data structures—one for each failure to be diagnosed. In one embodiment of this invention, each failure diagnosed is independent of the others since there may be multiple failures for a single vehicle.

Each data structure is a series of rules that can be applied to the vehicle population in the form of "if." Each vehicle has one and only one applicable rule per data structure. The algorithm then, for each data structure (or failure), compares the vehicle's parameters with those in the first rule. If the parameter values don't match, the algorithm goes to the next rule. As soon as a matching rule is found, the probability that corresponds with the parameters is provided and the data structure is exited. Thus, through parsing, the failure analysis feature of this invention matches emissions result to the repair diagnosis (thus providing real-time analysis as opposed to batch-calculations).

The classifier table is a data structure used in the knowledge-based system and is made up of rules that can be applied to make predictions. The rules represent leaf nodes of a decision tree. Methods of induction of decision trees from suitable empirical data have been studied by artificial intelligence and statistical researchers since the late 1970's. The tree generation is provided by a commercially available program such as KnowledgeSEEKER(™) by Angoss Software which uses a CHAID or a $Chi^2$ Automatic Interaction Detection algorithm or by a variant of ID3 which was devised by J. Quinlan, published in "Machine Learning," 1986. Tree generation output, which is one element of the update process, will be discussed in detail below. The preparation of the raw data into input to CHAID is uniquely determined by an initial analysis in the detailed design and implementation phase and is described in the second section of this detailed description of this invention.

The output file is modified to form the classifier as described in detail below. The rule files are inputs to the classifier formatting module (see FIGS. 4b and 3d below). In other words, a classifier is a rule file that has been reformatted and optimized to be useable by the failure analysis module and the classifier table is a collection of one or more classifiers.

Once a repair diagnosis has been made, the diagnosis 32 may be ordered by listing the most likely cause first or by associating a probability with each one, depending on the source of the items and whether the probability data is desired. For example, the learning process, which is discussed in detail below, will identify problems that frequently occur. This allows the probability to be calculated and included in the knowledge base and diagnosis.

FIGS. 3a–d combined show an example of a repair strategy report providing diagnostic assessment 32 (see FIG. 1) as output of the classifier table. For a 1984 Nissan truck with an idle HC=629, idle CO=8.49 and idle $O_2$=9.7 two failure categories (ignition failure probability (FIG. 3a) and air induction failure probability (FIG. 3c)) are generated using characteristics of the vehicle and emissions data which satisfy the classifier table.

Specifically, the air induction failure shown by the combination of FIGS. 3c and 3d are satisfied by rule 10 below. In processing processor 26 matches vehicle make and model year; vehicle mileage; emissions composite values; and rules of the classifier table. The algorithm processes the rules in the classifier table 41 to pull out predictors that match vehicle and test data and associated failure probabilities as shown in FIGS. 3a–d. These figures were demonstrated using data from a two-speed idle test.

Classifier format modules shown in FIGS. 3b and 3d identify predictors for the failures probabilities shown in FIGS. 3a and 3c. The graphs show the probability of a problem in the repair category and how this vehicle compares with other failed vehicles for the repair categories. The rules above create the classifiers which form the classifier format modules of FIGS. 3b and 3d.

In FIG. 3b, the predictor categories of HC and CO at idle correlate with ignition failure. A value of idle HC which is between 346 & 786 and the idle CO which is greater than 1.27 indicates a slightly reduce probability of ignition failure over the average vehicle.

In FIG. 3a the ignition failure probability is shown with regard to all failing vehicles (47%) and with regard to this vehicle (45%). Similarly, in FIG. 3d, three predictor categories are shown which present air induction failure symptoms. In FIG. 3c the air induction failure probability is shown with regard to all failed vehicles (17%) and with regard to this vehicle (33%).

The repair categories most likely to be responsible for the failure of the 1984 Nissan are presented in order of descending probability. Alternatively, predictor percentage ranges may be mapped to English language descriptions, such as high, moderate and low. From FIG. 3c it can be seen that there is an elevated likelihood that the 1984 Nissan truck will have an air induction failure compared to that particular failure with respect to all failed vehicles which is extremely useful information for a repair technician in repairing the vehicle.

Below is a listing of potential failure categories and subcategories which reflect groups of repair actions that exhibit similar symptoms. These are subject to change in size and content depending on the learning process performance discuss below. Subcategories are lowest level of information. The level of information provided as a diagnostic assessment is dependent upon the correlations which can be drawn during the learning process discussed below. This is also constrained by the repair actions, the lowest level of detail given on the vehicle emissions repair report. The failure categories and the repair actions corresponding to each category are for example:

fuel_delivery
    carburetor adjustment
    speed adjustment
    carburetor
    choke
    cold start
    fuel filter
    hoses
    injector cleaning
    injector(s)
    inlet restrictor
    pump
    regulator
    motor/valve/solenoid
    tank
air injection
    belt
    check valve
    control
    pump
    tubes
    valves
ignition
    cap/rotor
    coil
    distributor
    initial timing
    module
    plugs
    spark advance control
    wires
egr
    control system
    passage/hose
    sensor
    valve
evaporation
    carbon canister
    control
    filter
    hoses
    gas cap
    purge valve
catalytic converter
    converter
    heat shield
    preheat catalytic converter
air_induction
    air filter
    ducts
    sensor
    thermostatic air door
    throttle bore
    oil change HI CO
        could put in oil & coolant level
        diluted oil
pcv
    crankcase ventilation
    hose
    passage
    valve
electronic_control
    air control
    canister purge control
    coolant sensor
    ECM
    EGR control
    idle control MAP sensor/switch
mass air flow sensor
mixture control
pressure sensor
PROM
RPM sensor/switch
spark control
temp sensor/switch
throttle position sensor/switch
vehicle speed sensor
$O_2$ sensor
   $O_2$ sensor
exhaust
   exhaust components
   manifolds
vacuum_leak
   vacuum leak
engine_mech
   valve
   valve timing While each category listed above includes subcategories, these subcategories can include subcategories of their own. As the classifier table becomes more accurate, more subcategories can be addressed by the rules independently as a category.

Standardization of repair information and consistency is preferable. To provide consistency, where the repair technician is equipped with appropriate computer hardware and software, diagnostic assessments are presented electronically, and via dial-up phone line, for example, by Internet data delivery. The diagnostic assessments are also provided on a printed failure report at the inspection lane which the vehicle owner presents to the repair technician.

As discussed above, the classifier table 41 has been previously built and stored for access during processing by comparator 42. Accordingly, the classifier table 41 provides the ability of this invention to "close the loop" between the repair mechanic and the inspection system by providing increasingly accurate diagnostic and repair statistics to increase the success rate of the repair process, bringing more vehicles into compliance under waiver limits.

Above, mainly the failure diagnostic feature of this invention has been described. That is, this detailed description up to this point has been directed to the explanation of the emissions testing process in general with reference to the initial diagnostic assessments feature of the this invention. Below, the learning process or update feature of the invention is described in detail. Accordingly, the following section describes the learning process feature of this invention which uses emissions testing information generated from failed tests and passing retests to update the predetermined criteria used to make initial diagnostic assessments. That is, failed emissions test data is used, and passed retest data is used only to validate that repairs performed were successful. The retest emissions results might include information such as that found in FIGS. 2a-2f.

Figures 4A, 4B:
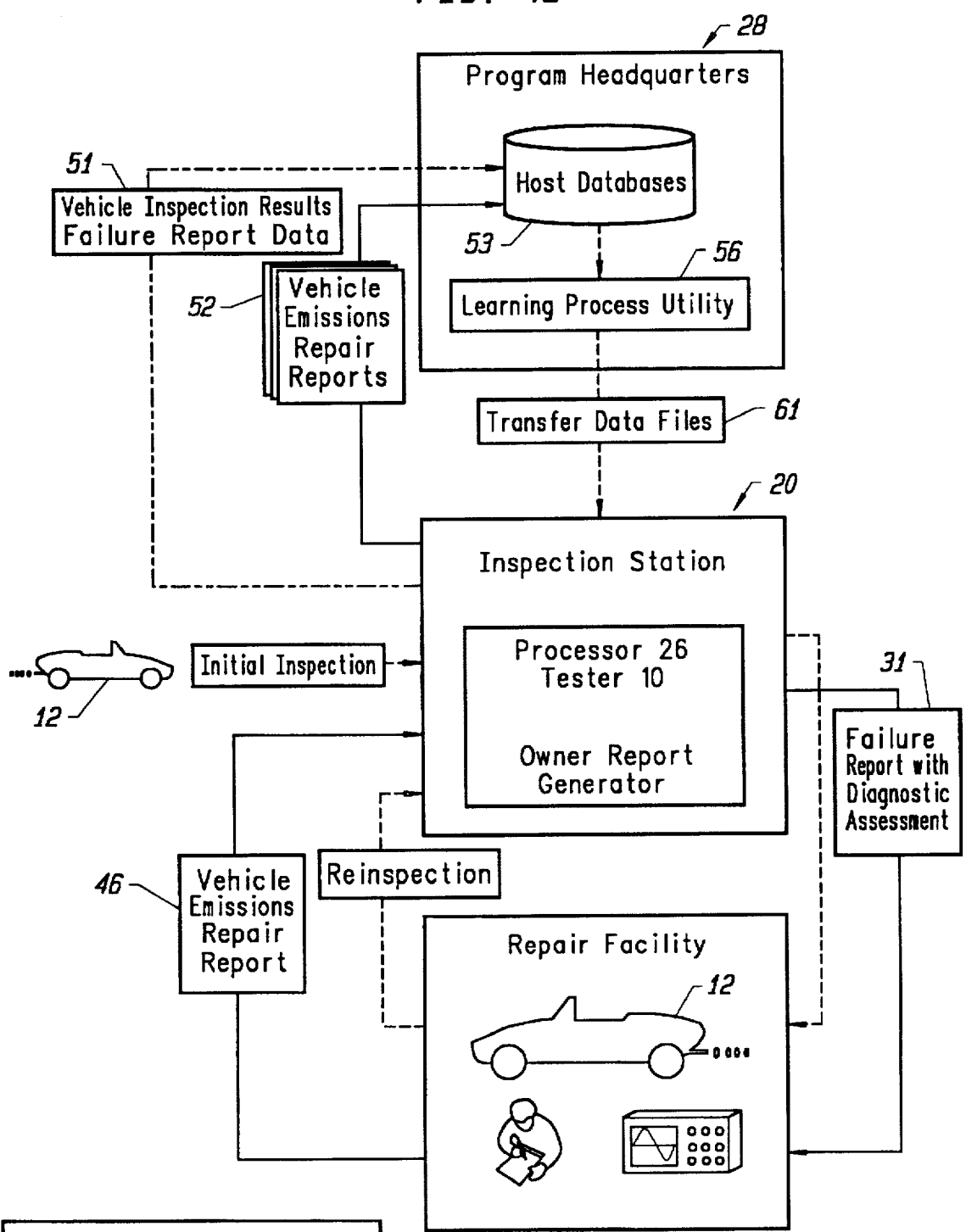

Looking at the overall process of this invention, including the update feature is provided by FIGS. 4a and 4b where FIG. 4a shows the system and FIG. 4b provides a legend for the path configurations. The vehicle 12 visits the inspection station 20 and receives a failure report with diagnostic assessment 31. The vehicle visits the repair facility 25 and receives repairs, such as those most likely including those suggested by the failure report 31 as discussed in detail above. The repair facility 25 generates a repair report 46 and the inspection station 20 retests the vehicle 12. That retest information 51 is sent to the host 28 along with vehicle emissions repair reports 52 to be gathered as part of host databases 53. The learning process 60 performs as described below and updated classifier data files are transferred 61 to the inspection station and processor 26.

By capturing information regarding repairs 46 performed on vehicles that fail emissions inspections, and then retesting the vehicle by emission analysis system 10, information is provided to processor 26 which is collected and used to update classifier table during the learning process. Performed repair data 46 is input to the host 28 so that it corresponds unambiguously with the vehicle test results record 31 and diagnostic assessments 32.

As mentioned above, the learning process may be initiated on the host or other centralized apparatus. Alternatively, the learning process operates in a client server mode with the learning process connected directly to the host database tables and a client application running on the PC. In this configuration, these functions would be implemented in a client application and the output could be any file formate acceptable to a tree building algorithm.

The user interface that initiates the learning process preferably requires the following information from the user: data collection start date; vehicle test type desired for programs that have multiple test regimes, i.e. two-speed idle, I/M 240; and the value to be used for excluding marginal failures, fail_margin.

Suitable data are selected, files are assembled and written out to a file for vehicle records meeting the learning process criteria. There are several separate types of functions performed including: creating reports that monitor the effectiveness of the learning process and the diagnostic assessments issued; filtering vehicle records for learning; assembling a data record in a temporary table for acceptable vehicles including formatting and checking failed values; copying the contents of the temporary table data to an input file for the learning process; creating additional data files for use in the lane diagnostic subsystem.

Before actually discussing the learning process itself, the preliminary reports are discussed in that they are generated through the process of preparing the learning process data for the learning process operation.

Figure 5:
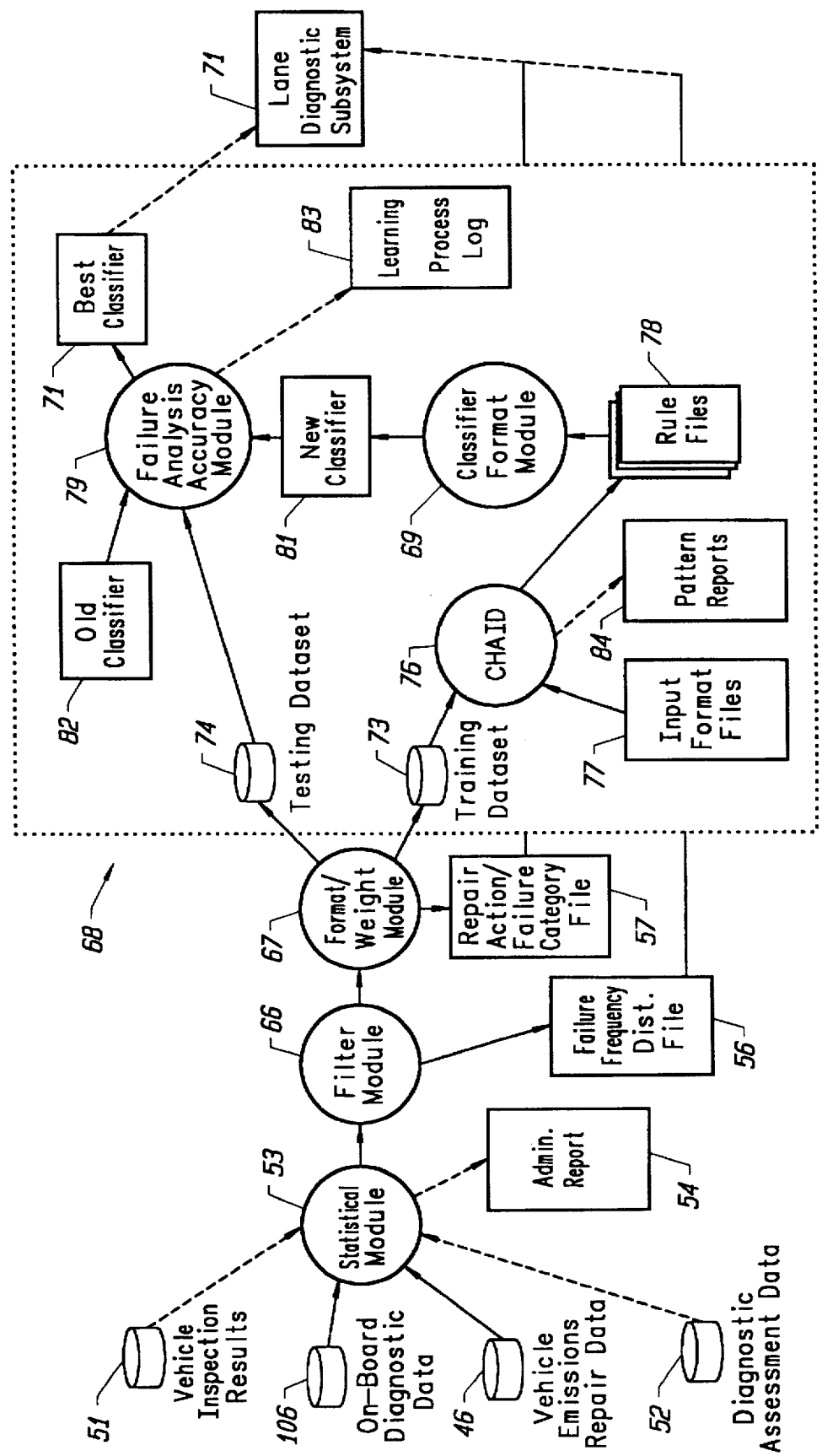
FIG. 5 is a systematic diagram of the learning process feature of this invention.

Turning to FIG. 5, there is shown a systematic diagram of how the host diagnostic system performs updates of the classifier table's knowledge base. The update is an ongoing process of "learning": the statistical module which receives new data 53 including actual repair data from retested vehicles; and data from other testing programs in the form of individual records (as discussed above); filtering for errors and weighting the data 66 according to its value or ordering its application so that more credible measures have a greater influence in forming the diagnosis; formatting and compressing data 67 so that it is in a form which can be correlated; correlating the actual repairs with the predictors to create rules 76; compressing and concatenating the rules 69 to provide data structures for individual failures and provide compaction of the data structure; testing the compacted classifiers to determine accuracy 79; updating the knowledge base for distribution to all locations where it resides. The frequency of the updates is adjustable. The determination of which data to use and how to format it is nontrivial. In one embodiment, the OBD data is included in the learning process. In a different embodiment, the vehicle's OBD overrides some or all probabalistic predictions.

Each element of the update feature as outlined above is now discussed in more detail. Returning first the statistical module 53, the statistics given here are descriptive in nature and are formatted and output in the repair effectiveness report in the form of an administrative report 54. The values are preferably computed for the data collection period input by the user to cover the learning process. These vary by emissions testing program and may include the following: number of failing vehicles broken down by type of failure (standard failed) and test regime applied; number of failure reports 31; description of OBD operations performed and results, including retest success/failure rates; frequency distribution of vehicle emissions repair report 46; frequency distribution of vehicle emissions repair report 46 failure categories for all failed/repair vehicles; and frequency distribution of multiple retest repair actions (hard-to-diagnose repairs) by subsequent retest result (repairs made followed by failing retest and hard-to-fix repairs made followed by passing retest).

Again, certain reports are generated relating to the input data as the data is prepared for the learning process 68. For example, a repair effectiveness report in the form of administrative 56 describes the repair actions performed on failed vehicles. A repair effectiveness report is used primarily to help understand the distribution of repair actions in the failed vehicle population and to identify those repairs that are difficult to diagnose, marginally effective, and ineffective. The inputs to the report are the descriptive statistics from the statistics module and could include input from the failure frequency distribution file 56 which uses effective, successful repairs only. The performance of the learning process 68 is best given by the learning process log 83 (discussed below).

The filtering function of the update or learning process feature of this invention, the filter module 66 filters vehicle records through selection criteria. Rows from the repair_data table meeting the selection criteria are put in a temporary table. The following selection criteria apply:

1) The filter module selects vehicle records based on a data collection start data calculated or input by the user. The default start date should precede the date of the last learning process by a couple of weeks to allow selection of vehicles that were excluded previous due to an incomplete test/repair/retest cycle.

(2) The filter module selects only vehicle with regular, documented test/repair/retest cycles consisting of the failed emissions test record and the vehicle's next consecutive passing retest with full repair information. The following types of data are filtered out: waived vehicles; test records other than the last two (failed followed by pass result) for vehicles with multiple repair/test cycles; aborted inspections; vehicles that failed on tampering or purge/pressure only; vehicles without repair or retest records.

(3) The filter module compares initial test results with emission standards. Select only vehicles that failed the initial inspection with at least one emissions component that exceeded the standard by at least fail_margin % and subsequently passed on the next retest. Note that this is the only occasion where values from the passed retest are examined.

(4) The filter module selects at least row_min (i.e. initially 8000) rows. A stop and issue message is provided if fewer than row_min rows are available. Preferably, values used are empirically determined.

(5) The filter module checks that the temporary table contains rows that are unordered with regard to the symptoms and the population of the available records. Care is taken that population of the table or subsequent copying of the table is not done using an index or key that creates such an order, even indirectly. If 15000 rows are available and only the first 8000 are chosen, the population used is then skewed with respect to the ordering variable. For example, VIN would skew the data with regard to vehicle make via the international manufacturer code; similarly, selection by plate might skew the data with regard to model year. Ordering, for example, by test date would not present these problems.

(6) The filter module selects vehicle rows according to the test type under consideration. Preferably, all vehicles undergo the same emissions test regime.

With regard to the next update feature element. the formatting and weight module 67, the inputs are rows from the filter module 66. The result is a temporary table, learning_process, filled with suitably formatted learning process data. This module creates a row in the learning_process table for each row meeting the filtering criteria. Below, formatting standards to be applied to column values are discussed. The output from the formatting and weight module 67 are two input files used by the learning process 68 and two data files used in the inspection lane 20.

The columns in the learning processes 68 table typically contain three different kinds of data. A first type of data is a vehicle description. The following columns and their values describe the vehicle characteristics and are taken directly from the repair_data table:

make model_year vehicle_type cylinders cc_displacement odometer

These columns are the same for all test types.

A second type of learning_process data is initial test results. These columns represent the vehicle's emissions test results and depend on the specific test regime. The following three blocks of data are under evaluation for the I/M 240 test regime. At least one block will be used. All data is from the initial test (before).

*BLOCK1 *SOURCE: repair_data table*

*before_hc_phase2

*before_co_phase2

*before_co2_phase2

*before_nox_phase2

*BLOCK2 *SOURCE: repair_data table*

*before_hc_composite

*before_co_composite before_co2_composite

*before_nox_composite

BLOCK3 **I/M 240 second by second*

*hc_accel

*hc_cruise

*hc_decel

*hc_transient

*co_accel

*co_cruise

*co_decel

*co_transient

*co2_accel

*co2_cruise

*co2_decel

*co2_transient

*nox_accel
*nox_cruise
*nox_decel
*nox_transient

Blocks 1 and 2 values are immediately available from the repair_data table. Block 3 values are derived from I/M 240 second-by-second data by summing the emissions components values over four different driving modes. These modes are acceleration (accel), cruise, deceleration (decel), and transient. The I/M 240 accel, cruise, decel and transient modes are identified in Table 1.

Table 1

I/M 240 Mode Definition

| Mode Number | Mode | From (seconds) s0 | To (seconds) s1 |
|---|---|---|---|
| 1 | Accel | 0 | 15 |
| 2 | Transient | 15 | 54 |
| 3 | Cruise | 54 | 79 |
| 4 | Decel | 79 | 93 |
| 5 | Accel | 93 | 106 |
| 6 | Transient | 106 | 156 |
| 7 | Accel | 156 | 187 |
| 8 | Cruise | 187 | 200 |
| 9 | Decel | 200 | 239 |

Values for Block3 columns are the sums of the stored emissions component values over all the relevant time steps in the mode. For example, the hc_accel value for a given vehicle is the sum of hc values recorded over the acceleration modes 1, 5, and 7, or $$hc\_accel = \sum_{accel} \sum_{s=s0}^{s1} hc(s),$$

where hc(s) is the hc second by second value at time s. One may also want to throw out mode 1 and evaluate the potential of the transient modes. The mode definitions are shown in Table 1.

Two-speed idle testing results in two values for each emission component HC, CO, and $CO_2$: one at curb idle and one at 2500 rpm. In addition, the engine rpm value at idle is used.

The third type of data is failure categories. Additional fields record failure categories for repairs made to the vehicle. Repair actions from the repair_data table are mapped to failure categories. Categories reflect groups of repair actions that exhibit similar symptoms. This mapping is recorded in the Repair Action/Failure Category file. A copy of this file is transmitted to each inspection lane 20 where it is kept on the lane controller computer. Failure categories are subject to change, depending on the learning process performance. Preferably, changes are documented in the learning process log 83 and as well as the documentation for this system and the Repair Action/Failure Category file used in the inspection lane 20.

The failure categories and the repair actions corresponding to each category are listed above. These columns are of datatype bit with values either 1, signalling that one or more repair action was made in the category, or 0, signifying that no actions were taken. Actions that were recommended but not performed are not included.

Another characteristic of the data is value standardization. That is, table values are checked as follows:

1. Numerical fields do not contain unreasonable values that would skew the analysis results. Acceptable bounds for these depend on the field. Records with nonsensical or outlying field values may be deleted from the analysis or have the field reset to the nearest acceptable value, respectively.
2. Categorical fields, such as Make, match a valid Make value. Because learning process data or classifiers may be shared across programs, the categorical fields remain consistent regardless of agency requirements.
3. Optional fields should default to NULL.

The output files as described above that is, those that have been filtered, formatted and weighted are input to a decision tree system using an algorithm such as CHAID 76 described above. The final step before input to CHAID is creating output data files for use in tree building step.

Four output files are created including the Repair Action/ Category File documents, the specific Repair Actions and their respective Failure Categories used in the Learning Process. The Repair Actions are shown on the vehicle emissions repair report. The failure frequency distribution file 56 documents the relative frequency of a failure category in the failure population. This file contains two values for each failure category: the name of the failure category and the percentage of the vehicles in the temporary table exhibiting the failure.

Two output files are created which contain data from the temporary file. Half of the rows should be placed in a file with extension .trn to be used for training purposes 73. The other half are put into a file with extension .tst to be used for testing 74 the accuracy of the created classifier. The CHAID algorithm 76 accepts delimited ASCII format files. Assume a comma delimiter. The creation of these files depends on the relational database used. In Sybase, for example, the bulk copy utility can be used. Alternatively, the algorithm could be encoded as a relational database procedure.

Once training 73 and testing 74 files are available on the host, they can be transferred to the learning process 68. The CHAID algorithm 76 import format files are directly imported as ASCII flies with an optional import format file. One import format file is required for each failure category. The format files have the same name as the failure category with extension .iff. The format file is used to specify acceptable delimiters, the field names, and the status of each field. The status options and delimiters are:

| | |
|---|---|
| E | Erase-Ignore data in this field |
| D | Dependent variable-the failure category to be analyzed and predicted |
| I | Independent variable-the fields containing variables that may be predictors |

Each format file has the failure category under consideration marked with a D for dependent variable. All other failure category fields are marked with E options (they are not under consideration and no a priori knowledge is available). All other fields are marked with the I option.

The import files and structure of the CHAID algorithm 76 runs are described here. Another implementation of this algorithm or a similar algorithm would have similar methods for identifying the independent and dependent variables and for identifying the variable types, i.e. categorical (ordered or unordered) or continuous.

The failure prediction problem and its solution are formulated to assume that failures are independent of each other due to the high number of multiple failures and the lack of a priori knowledge about the existence of other failures. Each time the tree building is run, texaminsence or absence of a failure in a single failure category is examined. A tree structure is created which represents statistically significant relationships between predictor category values and the failure category under consideration. The existence of other kinds of failures is suppressed through the import format file.

The CHAID algorithm 76 runs are made using the import format files 77 and the training data files 73 (file extension .trn) as described above. The output from CHAID for each run is a single rule file 78. A rule file contains a variable number of production rules that describe the leaf nodes of the tree structure. Each rule describes a subset of the general vehicle population for which the likelihood of the given failure is significantly different from the general population.

A rule is a conditional statement of the probability of the particular failure for a well-defined group of vehicles. The conditions that define the group of vehicles are values for one or more of the predictor (independent) variables. Only predictors that significantly correlate with the given failure are present in the rule file.

An excerpt of a rule file for the AIR_INJ failure category is given below (note that these are not the same category names as given above). Although each rule has at least one IF condition, a rule may have one or two probability statements.

```
RULE_1 IF
       MAKE = AC, ACURA, ALFA, AM GE, AUSTI, HYUND, LOTUS, MITSU,
OPEL, PANTE, SAAB, SUBAR, SUNBE, SUZUK or VOLKS
       HIGH_O2 = [-5.4,8.5)
THEN
       AIR_INJ = 0 99.0%
       AIR_INJ = 1 .0%
RULE_2 IF
       MAKE = AC, ACURA, ALFA, AM GE, AUSTI, HYUND, LOTUS, MITSU,
OPEL, PANTE, SAAB, SUBAR, SUNBE, SUZUK or VOLKS
       HIGH_O2 = [8.5,29.6]
THEN
       AIR_INJ = 0 90.9%
       AIR_INJ=1 9.1%
RULE_3 IF
       MAKE = AMC, BUICK, CHEVR, FIAT, FORD, GMC, ISUZU, JEEP,
MAZDA, OLDSM, or TOYOT
       MODEL_YR = [55,74)
       HIGH_O2 = [-5.4,0.2)
THEN
       AIR_INJ = 0 72.7%
       AIR_INJ = 1 27.3%
RULE_4 IF
       MAKE = AMC, BUICK, CHEVR, FIAT, FORD, GMC, ISUZU, JEEP,
MAZDA, OLDSM, or TOYOT
       MODEL_YR = [55,74)
       HIGH_O2 = [0.2,2.4)
       ODOMETER = [0,115496)
THEN
       AIR_INJ = 0 95.3%
       AIR_INJ = 1 4.7%
```

The rules are mutually exclusive and cover the entire training set, i.e., exactly one rule applies for each vehicle.

CHAID parameters include the following:

1. Automated runs are made using Cluster method.

2. The filter menu value should be set to Prediction (the default), corresponding to a 5% maximum statistical error level.

3. The significance value should be set to adjusted (the default).

4. Suggested Bonferroni adjustment setting is 3 based on relationship between input parameters odometer and model_year.

CHAID rule files 78 are not suitable for use in the learning process. The classifier formatting process takes the rule file and encodes the text-based rules into fields separated by opcodes that enable execution of the rules. It also extends the ranges of the values to ensure that the rule set is onto the vehicle population.

Classifier formatting consists of two passes. Each of these is discussed in the following sections.

During the first pass, a recursive descent parser reads in the rule file generated by CHAID and builds the encoded classifier file. The layout of the classifier file is depicted in Table 2 below. Each rule layout starts with the Rule_Name and ends with End_of_Rule.

TABLE 2

| Rule Layout |
| --- |
| Rule_Name |
| Condition_1 |
| Condition_2 |
| . |
| . |
| . |
| Condition_n |
| End_of_Condition |
| Failure Category |
| Probability Failure Exists |
| End_of_Rule |

Each rule may contain one or more conditions. Each condition consists of a predictor name and a range or list of predictor values. Predictors may be continuously-valued, such as those having real number values. They may also be categorical, such as the make predictor category. The last condition is denoted by the End_of_Condition field. If the condition is a Make Condition where Make represents any categorical predictor, then the last categorical value is followed by the End_of_Make field.

Table 3 below depicts the layout of a condition. A Range_Condition always contains the Range_Condition opcode followed by four data fields. The bound types can be inclusive or exclusive. A Make_Condition contains the Make_Condition opcode followed by one or more categorical field values. The End_of_Make files signifies the end of the categorical field values.

As is done in the emissions inspection lane 20 (see FIG. 4a), the classifier lookup function in the accuracy module compares formatted data to rules in a classifier table. Here, the lookup operation applies the rules to the formatted

TABLE 3

Condition Layout

| Make_Condition | Make_1 | Make_2 | ... | Make_n | End_of_Make |
|---|---|---|---|---|---|
| Range_Condition | Lower Bound Type | Lower Bound Value | Upper Bound Type | Upper Bound Value | |

During the second pass, the range adjuster reads in the classifier field generated by the first pass and adjusts the upper and lower bounds of the conditions of the rules such that no vehicle in the population is ever out of bounds of all rules.

The inputs to the Failure Analysis Accuracy Module 79 are the test data file 73, the new classifier 81 for one or more failure categories, and the "Old Classifier" 82 for the failure categories. The function of the module 79 is to compare the accuracy of the new and old classifiers by applying both to a data set where the actual repairs are known. The output of the module 79 is a set of accuracy statistics and a set of classifiers that are the best classifiers for their respective failure categories.

The algorithm used for applying the classifier to the training data set for each category is as follows:

1. For each record in the test data set, obtain a prediction (probability value P) using the classifier lookup function in the accuracy module.
2. Assign the actual value of the repair field to A (recall A is either 0 for no repair performed or 1).

Multiply A by 100 to convert to percentage so that it agrees with units from classifier value. Then the variance for the test set containing n records is:

$$v = \frac{1}{1-n} \sum_{i=1}^{n} (P_i - A_i)^2$$

3. Compare the variance for the old and new classifiers. The best classifier is the one with the lowest variance, i.e., agrees best with actual values. This step is based on a one-tailed F test for large n.

A copy of the best classifier 71 for each failure category is saved on the learning process 86 to supply the "Old Classifier" for the next learning process cycle. The best classifier for each failure category are combined into on large classifier table 41 for transmission to the inspection lane.

The failure analysis accuracy module 79 takes a single instance of a vehicle record and, using a classifier table file, produces a failure probability for one or more failure categories. The functions included are:

1. Only in the learning process there formatting of vehicles characteristics and test results to agree with predictor standards for values and units (this is already done for the test dataset); and
2. In both the learning process and on the lane there is the selection or verification of proper classifier table file and classifier table file lookup.

These functions are performed on the learning process 68 to support the accuracy calculation, and in the inspection lane 20. The formatting function is not required for the accuracy calculation, since test dataset used is already formatted.

vehicle record which results in a probability value P for each classifier or failure category in the classifier table file.

For each failure category, compare the predictor values for the vehicle with the first condition rule. If the first condition is met by the vehicle predictor value, compare the predictor value for the second condition. If any condition is not met, go on to the next rule. If all conditions are a rule of a rule are met, assign P to be the value in the rule and skip all remaining rule for that failure category.

The Learning Process Log 83 is a record of all learning process activity. An entry is written to the log for each learning process performed. An entry contains:

Processing Date—that learning process is performed

Data collection dates—Range of test dates for data used

Test Type—2-speed, idle, loaded, I/M 240

Fail_margin value used

Source of Training Data—Program or zone name and range of emissions test dates

Number of Training Records

Source of Test Data—Program or zone name and range of emissions test dates

Number of Test Records

Changes made to Repair Action/Failure Category

Variance of old and new classifiers for each category

Notes on distribution to stations

The pattern report 84 consists of either the graphical tree diagram or the generic rule file as it is output from the CHAID algorithm 76 (not the reformatted version), as desired by the receiving parties. One tree or rule file is generated for each failure category which contributes to the new failure prediction classifier 81. A new tree or rule file need not be generated if it was found to be less accurate than the previous version.

Three types of data files are routinely transferred from the host to the inspection lane processor 26 (see FIG. 1) at each inspection state; the classifier table files on the learning process 68 and the frequency distribution file 56 and repair action/Failure category file 57 from the host computer 28. There are at least two methods for doing this transfer, that is, floppy and network methods.

The network method is as follows. The files containing the classifier tables are transferred via ftp. from the learning process 68 to the host. Host files are transferred from the host to the lane 20 via established network communications.

The second method of the file transfer is via floppy disk. The data processing manager at the host in such a case would copy the file to a floppy disk and transport that disk to the station housing the lane processor 26. The floppy method is a backup method in case the network is down.

Figure 6:
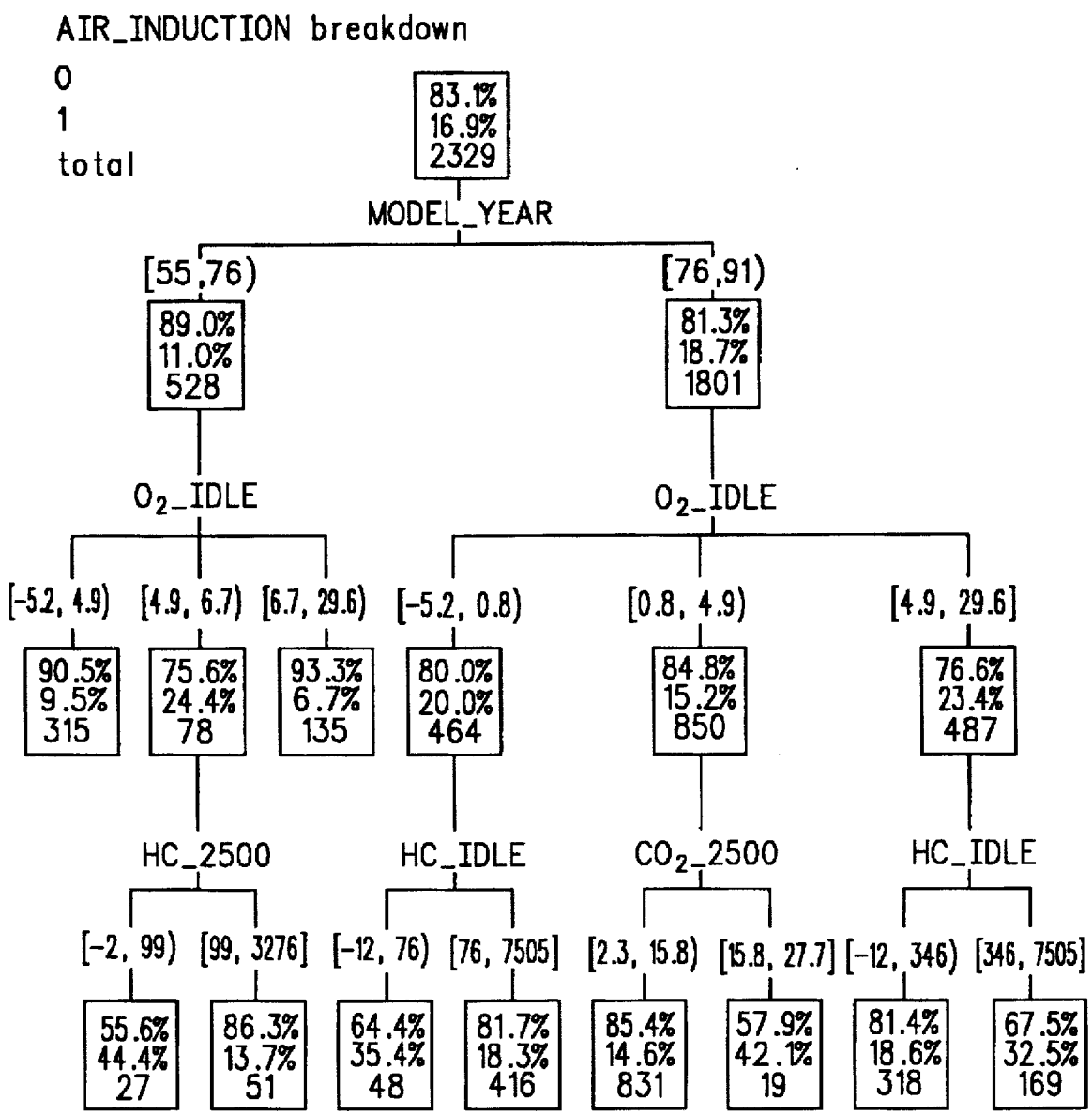
FIG. 6 is an example of a CHAID or similar algorithm tree output.

The tree construction of FIG. 6 is an example that was created using California Smog Check Data obtained in 1991.

The predictors (independent variables) are slightly different from a typical two-speed idle test, since O2 was measured in addition to HC, CO, and CO2. The diagnostic report shows two failure categories.

Tree output from CHAID shown in FIG. 6 is a tree representation of relationships found during analysis of two-speed idle failures. In this example, a training set of 2329 samples was analyzed. As shown in the root node, 16.9% of the vehicles were brought into emissions compliance after air induction repair actions. The remainder of the vehicles were brought into compliance after repair actions not related to air induction repair actions. Significant correlations were found between air induction-related failure and 5 of the predictor categories (independent variables): MODEL_YEAR, O2_IDLE, HC_2500, HC_IDLE, AND CO2_2500. Each of the terminal or leaf nodes represents a subset of the original set, characterized by a unique set of predictor values. These values were used to provide the sample repair diagnosis of FIGS. 3a–d.

The detail in the node shows the percentage of vehicles without air induction-related failure, the percentage with air induction-related failure and the number of vehicles in the node. For example, for vehicles having a model year between 1976 and 1991, O₂ at idle between 4.9 and 29.6, and HC at idle greater than 346, the incidence of air induction failure was 32.5%. In this subset of the population, the incidence of this failure is nearly twice that in the entire sample population (16.9%) and more than triple the rate of the same failure in older vehicles with low O₂ at idle (9.5%). The tree output is used as a pattern report.

The generic rule output is a set of rules that represent the leaf nodes of the tree. The tree shown in the example produces the following rule output:

```
RULE_1 IF
        MODEL_YEAR = [55,76)
        O2_IDLE = [-5.2,4.9)
THEN
        AIR_INDUCTION = 0 90.5%
        AIR_INDUCTION = 1 9.5%
RULE_2 IF
        MODEL_YEAR = [55,76)
        O2_IDLE = [4.9,6.7)
        HC_2500 = [-2,99)
THEN
        AIR_INDUCTION = 0 55.6%
        AIR_INDUCTION = 1 44.4%
RULE_3 IF
        MODEL_YEAR = [55,76)
        O2_IDLE = [4.9,6.7)
        HC_2500 = [99,3276]
THEN
        AIR_INDUCTION = 0 86.3%
        AIR_INDUCTION = 1 13.7%
RULE_4 IF
        MODEL_YEAR = [55,76)
        O2_IDLE = [6.7,29.6]
THEN
        AIR_INDUCTION = 0 93.3%
        AIR_INDUCTION = 1 6.7%
RULE_5 IF
        MODEL_YEAR = [76,27]
        O2_IDLE = [-5.2,0.8)
        HC_IDLE = [-12,76)
THEN
        AIR_INDUCTION = 0 64.6%
        AIR_INDUCTION = 1 35.4%
RULE_6 IF
        MODEL_YEAR = [76,27]
        O2_IDLE = [-5.2,0.8)
        HC_2500 = [76,7505]
THEN
        AIR_INDUCTION = 0 81.7%
        AIR_INDUCTION = 1 18.3%
RULE_7 IF
        MODEL_YEAR = [76,27]
        O2_IDLE = [0.8,4.9)
        CO2_2500 = [2.3,15.8)
THEN
        AIR_INDUCTION = 0 85.4%
        AIR_INDUCTION = 1 14.6%
RULE_8 IF
        MODEL_YEAR = [76,27]
        O2_IDLE = [0.8,4.9)
        CO2_2500 = [15.8,27.7]
THEN
        AIR_INDUCTION = 0 57.9%
        AIR_INDUCTION = 1 42.1%
RULE_9 IF
        MODEL_YEAR = [76,27]
        O2_IDLE = [4.9,29.6]
        HC_IDLE = [-12,346)
THEN
        AIR_INDUCTION = 0 81.4%
        AIR_INDUCTION = 1 18.6%
RULE_10 IF
        MODEL_YEAR = [76,27]
        O2_IDLE = [4.9,29.6]
        HC_IDLE = [346,7505]
THEN
        AIR_INDUCTION = 0 67.5%
        AIR_INDUCTION = 1 32.5%
```

As mentioned previously, the rule files are inputs to the classifier formatting module shown in FIGS. 3b and 3c.

In summary, the learning process periodically analyzes the data and creates a knowledge base in the form of a new or revised classifier, which together with other classifiers form a classifier table. The learning process learns about vehicle emissions failures by studying examples of successful repairs.

The analysis judges the effectiveness of repairs performed and looks for significant correlations between vehicle or test characteristics and successful repair actions. This knowledge is applied to predict the most likely causes of failure for a specific vehicle based on its characteristics and emissions test results including I/M 240 transient data. The learning process takes into account a variety of characteristics including vehicle make, model, year, engine size, mileage emissions test results including transient test data based on the modal analysis of the second-by-second data. The learning process produces the best indicators of failure from this multitude of characteristics and produces only useful conclusions. Thus, this invention allows a large number of input parameters to be evaluated and the algorithm determines which ones correlate with failures. The best predictors for each failure are used and include several that have not been used before.

By using the information on the effectiveness of actual repairs performed on vehicles and the results of retests, the learning process learns from successful repairs. By using a large number of successful cases and looking for statistically significant correlations between symptoms and repairs, the learning process screens out the effects of low-quality (usually random) repair actions.

Preferably, the host will issue periodic administrative reports 54 and learning process log entries 83 sufficient to monitor the effectiveness of the diagnostic system and pattern reports to document vehicle test and repair trends found in the data. The frequency of report generation and learning process will be adjusted.

The administrative reports 54 and learning process log 83 include the number of diagnostic reports being issued, the principal measures used to generate them (e.g. OBD used), and their accuracy as documented by repair information gained on their reinspection. Analysis of diagnostic accuracy will show the distribution (e.g. make/model/year) over vehicle type in enough detail to monitor vehicle coverage.

The pattern reports 84 identify trends observed in the data. These reports are useful to identify for example: significant numbers of similar vehicles that have failed the inspection or emissions test because of a common defect; vehicle failure rates by season or geographical region; vehicles with high multiple retest rates to identify failure types or vehicles that the repair industry has problems diagnosing.

In the first section of this description of the invention, the repair report 46 generation was described. In the second section, the update process 68 and steps prior to that process has been described in detail. In this final section more detail is provided with respect to the emission inspection lane 20 and the interaction with the reports which are generated upon an emissions test.

Figure 7:
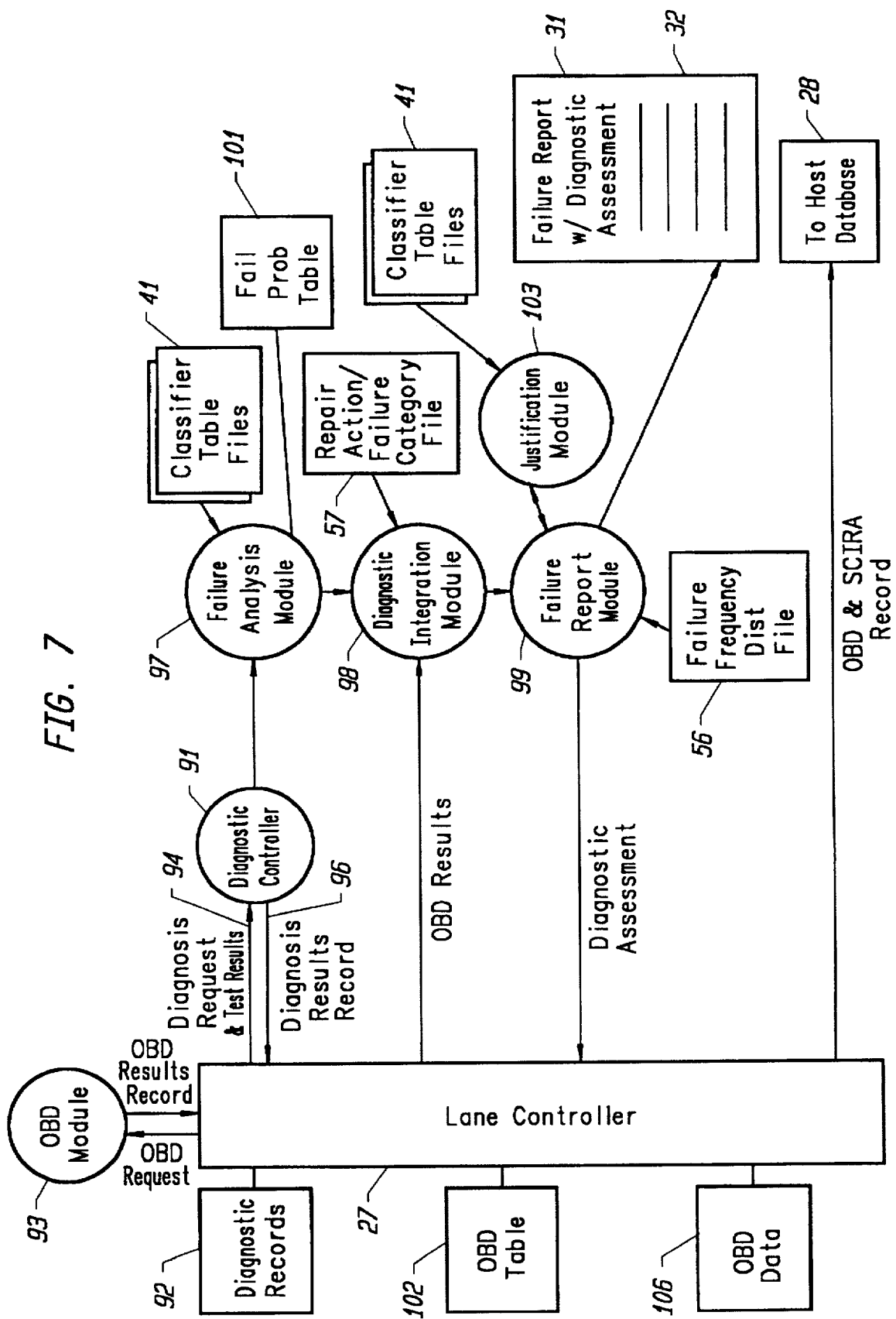
FIG. 7 is a systematic diagram of the lane controller with the diagnostic assessment generation.

Turning to FIG. 7, some of the elements shown in FIG. 5 and FIG. 1 are shown in combination. As shown in both FIG. 1 and FIG. 7, the diagnostic controller 27 serves as an interface between the classifier table 41 and the lane controller 27. Before describing the elements of FIG. 7 in detail, a summary is provided.

The existing lane controller 27 performs the vehicle emissions test. The lane controller 27 also makes a request to the OBD module 93 to determine the status of the vehicle's on-board diagnostic system MIL (malfunction indicator light), when applicable, and downloads the OBD diagnostic trouble codes and sensor data resident in the OBD computer memory as a result of the malfunctions. The OBD module 93 may also access real-time sensor data generated by the vehicle OBD computer as an input to the diagnostic subsystem.

The lane controller 27 issues a diagnosis request to the diagnostic controller 91 when a vehicle has failed the inspection process. The request is accompanied by vehicle characteristics and test data needed as input to the failure analysis module 97. Under certain circumstances, selected vehicle OBD sensor data is input to the failure analysis module 97.

The failure analysis module 97 formats the data for compatibility with the classifier table files 41, including computing derived values from I/M 240 second-by-second data where applicable. The failure analysis module 41 performs a lookup in the appropriate classifier table file and retrieves a failure probability for each failure category to be diagnosed. The categories are ranked according to the probability and input to the diagnostic integration module 98. The diagnostic integration module 98 reconciles the probabilistic results with recent repairs made to the vehicle (for those undergoing multiple test failures) and OBD diagnostic trouble codes retrieved from the vehicle (under circumstances where OBD input is used). The integrated diagnosis is sent to the failure report module 99 for creation of the report.

Here, symptoms associating this vehicle with each failure category are retrieved from the classifier table 41 and converted to an English-language phrase by the justification module In FIG. 7 some of the elements shown in FIG. 5 and FIG. 1 are shown in combination 103. Also, the relative incidence of failure in the general failure population for each failure category is retrieved from the failure frequency distribution file 56 for including in the failure report. Moreover, included in the failure report are the plots of the vehicle's emissions results compared with a typical passing vehicle and any OBD results obtained. The failure report 31 and 32 is created and given to the motorist for use by his or her repair technician.

Turning to the details of the features shown in FIG. 7, the OBD module is first discussed. Generally, the data gathered at the lane 20 such as diagnostic 92 and OBD 93 records are also uploaded to the host in order to recreate any failure report. The contents of the OBD record 93 shall include the diagnostic trouble codes and the frames of data from the OBD session. The diagnostic data 27 items include the version number of the classifier, failure categories, and associated probabilities of failure. These data items are sent to the host and stored in a database table on the host computer.

Diagnostic records 92 are sent by the lane 20 via two transactions. One transaction sent by the lane is called the Put Diagnostic Rec and is identified by arrow 94. This transaction sends the diagnostic records in the host as identified by arrow 96. After the host receives the diagnostic records, the host sends a RSP_ACK to indicate that the data has been delivered.

The diagnostic controller 91 serves as an interface between the classifier table 41 and operations with which it is associated and the lane 20 software 27. The diagnostic controller module 91 serves as an executive for the classifier table 41.

The controller 27 will be implemented as an independent task. This task will be invoked when the vehicles gets to a position where the report needs to be generated. The diagnostic controller 91 accepts a diagnostic request from the lane 20 controller 27 This request indicates that failure analysis should now be performed.

The calling sequence of the controller 27 is as follows: upon receiving a diagnostic request, the controller invokes the failure analysis module 97, which reads in the necessary data and performs the failure analysis. The failure analysis module 97 invokes the diagnostic integration module 98, which integrates information concerning repairs that have already been done for the current vehicle being tested and the OBD test results. The diagnostic integration module 98 invokes the failure report module 99, which produces a failure report 31.

This vehicle data used as input to the failure analysis module 97 is preferably formatted to ensure compatibility with the data in the classifier table file 41. Any necessary units conversion and formatting is performed upon the vehicle data used as input to this module.

One of the inputs to the failure analysis module is the second-by-second data produced by the I/M 240 test. This data, known as Block 3 (see above), is summed for acceleration, cruise, deceleration, and transient for each kind of exhaust gas. These computed values and the vehicle test records serves as input to the failure analysis 97.

As discussed in detail above, the failure analysis module 97 uses the classifier table 41 that was generated by the learning process (see FIG. 5). There is a separate classifier table for each type of test conducted. If a lane 20 uses both the two-speed idle test as well as the I/M 240, both classifier tables are stored. The failure analysis module checks a field known as the test_type in the vehicle test record transmitted by arrow 94 to determine whether the test under way is a two-speed idle or an I/M 240 test. The failure analysis 97 implements a classifier lookup in order to execute a rule for a given failure category (see discussion above). The output of the table lookup is the rule name, the probability that a failure category is true, and the associated failure category. The rule name, failure category, and probability of the failure are stored in a failure probability table 101 for output shown as FIG. a–d.

The failure probability table 101 includes the rule name and associated failure category and failure probability values are contained in this table. Functions such as init, add, delete, and sort are supplied as operations of the table. The sort operation sorts the table in descending order of failure probabilities.

Turning to the OBD module 93, it maps diagnostic trouble codes observed onto the failure category file 57. Failure prediction is suppressed for those failure categories, similar to the multiple retest method. Other embodiments include suppression of a diagnostic assessment or the use of the retrieved OBD sensor data as inputs to the failure analysis module 97 for all vehicle supporting OBD.

The OBD module 93 performs downloading of the data from the vehicle. If the vehicle supports OBD, a message is sent to the lane 20 inspector instructing him or her to inspect OBD MIL status and functionality. After the lane 20 inspector connects the OBD cable to the vehicle and initiates downloading, OBD data is down loaded into a table on the lane 20 called OBD table 102. Two kinds of data are downloaded: diagnosis trouble codes and frames of sensor data.

The integration function of the OBD module 93 involves mapping the OBD diagnostic trouble codes to failure categories. Each diagnostic trouble code is mapped to a failure category in the table 57 in the following manner: for each diagnostic trouble code, a corresponding failure category is mapped in the adjacent column of the OBD table. A data table is available that associates all diagnostic trouble codes to failure category if one exists.

The OBD module 93 operations supplies functions to access the OBD table 102. The diagnostic trouble code and associated failure category are found in this table. Functions such as init, add, delete are supplied for this table. Module 93 also supplies functions to build an OBD record from information in the OBD table and to send this record for storage in the OBD database.

Turning to the diagnostic integration module 98, this module integrates the probabalistic failure analysis results with other sources of information available about the vehicle. For vehicles undergoing a second (or greater number) retest, there is a possibility that data will conflict. To avoid that possibility steps can be taken.

The results of a recent repair session are available on the vehicle emissions repair report 32 surrendered to the lane 20 inspection at the outset of the retest. The system will display a menu on a screen consisting of a list of possible repair actions that are identical to those on the vehicle emissions repair report 32. The lane 20 inspector will move the up/down arrow key to a repair action on the screen that matches a repair that has already been done for the current vehicle and hit the enter key to select that repair. The repairs that have been input by the lane 20 inspector are mapped to the failure categories used by the repair action/failure category file 57. If a particular vehicle has had one or more repair actions performed in a given failure category, that entry is deleted in the failure probability table 101 so that a probabilistic prediction will not be made in the failure report 32.

Another source of possibly conflicting information about the vehicle is the OBD data retrieved from the on-board computer. This is one possible means of integration. The diagnostic integration module invokes a function in the OBD module that maps the OBD diagnostic trouble codes to corresponding categories. Each failure found in the OBD table is compared with the failures found in the failure probability table 101. If a match exists and the failure probability of the matching failure in the failure probability table 101 is less that some threshold probability value, then that failure is deleted from the failure probability table.

The diagnostic integration module 98 also builds a diagnostic record from the information contained in the failure probability table as well as the version number of the classifier. The diagnostic record is sent to the host 28 for storage in a data base.

Turning to the failure report module 99, when generated, it includes all diagnostic information obtained. A public domain plotting package is used to construct the failure report.

The failure categories and the corresponding probabilities are retrieved from the failure probability table 101. The failure categories and failure probabilities are shown ranked from most likely to least likely. Also given is the frequency with which this failure category occurs in the failed vehicle general population (retrieved from the failure frequency distribution file 56). For each failure category in the failure report, there is a justification stating the vehicle's symptoms that are associated with that category. The justification is supplied by the justification module 103 and will be in the form of an English-like phrase. Moreover, OBD codes and data are also read from the OBD table 102 and inserted into the failure report.

The failure report module 99 also plot the emissions test values for CO, HC, $Co_2$, and $NO_x$ from the vehicle's I/M 240 test against a set of typical passing values if the I/M 240 was performed (see FIG. 2). The vehicle's test values and typical passing values are available at the lane 20. Both of these files are used as input to a plotting package to plot out the driving trace and typical passing values. The graph of the driving trace is plotted, for example, in terms of grams per miles vs. second. Turning to the justification module 103, its role is to supply the symptoms that justify the probability of failure generated by the failure analysis module 97. The symptoms are the left hand side (depending upon format) of the applicable rule from the classifier table file (see above).

To perform a justification, the first step is to determine which rule has been executed to produce the failure category and associated probability of failure. The second step is to look up those conditions on the left hand side of this rule and convert those conditions into an English-like phrase that justifies the failure category diagnosis.

The execution of the justification module 99 is as follows: first the justification module gets the rule name from the failure probability table 102; next the classifier table file 41 is searched until a rule is found that matches that rule name. All of the conditions of that matching rule are used as input for the justification phrase pertaining to that rule.

The justification module 99 also supplies a translation routine that translates the left hand side conditions derived from the rule into an English-like phrase for purposes of producing justification statements in the failure report.

To help the motorist whose vehicle failed the emissions test understand the diagnostic assessment relating to his or her vehicle, a preprinted brochure is given to that motorist. The brochure explains the probabilistic approach taken and the error expected. It also serves as a key to the failure categories used in the report and states which repair actions make up each failure category.

Accordingly, in summary, the above detailed description has described the features of this invention including the preparation of a diagnostic report with a diagnostic assessment for a vehicle owner to use in repairing his or her vehicle to bring its emissions into compliance with emission standards. That is, the diagnostic assessment gives the vehicle owner's service technician probabilistic information about the likely causes of the vehicle's failure of the emissions test. The description also has shown how the diagnosis is derived from operations involving a classifier table which stores previously derived rules which form the basis for the prediction of the diagnostic assessment. Also, included is a detailed description of how an updated classifier table is generated where a vehicle which previously failed the emission test finally passes and how the information relating to the passing test is used to update the classifier table.

We claim:

1. A method for generating a diagnosis of a vehicle's cause of failure of an emissions test, wherein data is obtained relating to a plurality of vehicles which had failing emissions tests results and for which a prediction report was generated and wherein each of said plurality of vehicles has particular vehicle characteristics and also has passing emissions test results and a repair report, comprising the steps of:

in a storage media, storing a classifier table composed of a set of rules;

in an emissions testing facility, receiving and storing vehicle characteristics signals;

in said emissions testing facility, sampling emissions of said vehicle to create emission test results to generate a series of emission test signals;

transmitting to a processor said emissions test signals;

transmitting to said processor said vehicle characteristics signal; and comparing said emission test signals and said vehicle characteristics signals to said classifier table's set of rules in a manner in which forms said diagnoses of said vehicle's cause of failure and generating a prediction report thereof;

receiving said vehicle characteristics signals, said failing emission test signals and said passing emission test signals of said plurality of vehicles;

dividing said vehicle characteristics signals and said failing and passing emission test signals of said plurality of vehicles to generate a training dataset and a testing dataset; and correlating said plurality of repair reports with said training dataset to form new rules; and from said new rules, forming new classifiers.

2. A method as recited in claim 1 further comprising the step of matching said prediction report with a failure frequency distribution file to generate a diagnostic assessment report including failure probabilities.

3. A method as recited in claim 2 further comprising the step of transmitting said diagnostic assessment report to a host computer where said diagnostic assessment report is stored.

4. A method as recited in claim 1 further comprising the step of periodically updating said classifier table.

5. A method as recited in claim 1 wherein prior to said dividing step, said method further comprising the steps of:

filtering said vehicle characteristics signals and failing and passing emission test signals of said plurality of vehicles to remove certain data;

formatting said vehicle characteristics signals and failing and passing emission test signals of said plurality of vehicles; and weighting said vehicle characteristics signals and failing and passing emission test signals of said plurality of vehicles.

6. A method as recited in claim 1 further comprising the steps of:

processing said testing dataset and said classifier table to form first output;

processing new classifiers to form second output;

comparing first output with said second output to generate a set of updated classifier rules;

forming an updated classifier table from said updated classifier rules.

7. A system for generating a diagnosis of a vehicle's cause of failure of an emissions test, said vehicle having vehicle characteristics which form input to said system in the form of a vehicle characteristic signal, wherein data is obtained relating to a plurality of vehicles which had failing emissions test results and for which a prediction report was generated and wherein each of said plurality of vehicles has passing emissions test results and a repair report, comprising of:

stored in a storage media, a classifier table composed of a set of rules;

in an emissions testing facility, a receiving component for receiving said vehicle characteristics signal;

in said emissions testing facility, an emissions sampling apparatus to sample the emissions of said vehicle to create emission test results and which generates a series of emission test signals;

a transmitter for transmitting to a processor said emissions test signals;

a transmitter for transmitting to said processor said vehicle characteristics signal;

a comparator for comparing said emission test signals and said vehicle characteristics signal to said classifier table's set of rules in a manner in which forms said diagnosis of said vehicle's cause of failure and generating a prediction report thereof;

a receiver which receives said vehicle characteristics signals, said failing emission test signals and said passing emission test signals of said plurality of vehicles;

a division component which divides said vehicle characteristics signals and said failing and passing emission test signals of said plurality of vehicles to generate a training dataset and a testing dataset; and a correlation component which correlates said plurality of repair reports with said training dataset to form new rules and therefrom, new classifiers.

8. A system as recited in claim 7 wherein said system also stores a frequency distribution file, said system further comprising:

a matching component which matches said prediction report with said failure frequency distribution file to generate a diagnostic assessment report including failure probabilities.

9. A system as recited in claim 8 further comprising a transmitter for transmitting said diagnostic assessment report to a host computer where it is stored.

10. A system as recited in claim 7 wherein said classifier table is periodically updated.

11. A system as recited in claim 7 further comprising:

a filter which filters said vehicle characteristics signals and failing and passing emission test signals of said plurality of vehicles so that said signals meet selection criteria;

a formatting component which formats said vehicle characteristics signals and failing and passing emission test signals of said plurality of vehicles to be acceptable to said correlation component; and a weight component which weights said vehicle characteristics signals and failing and passing emission test signals of said plurality of vehicles so that each of signal is appropriated scaled.

12. A system as recited in claim 7 further comprising:

a processor which processes said testing dataset and said classifier table to form first output;

a processor which processes new classifiers to form second output; and a comparator which compares first output with said second output to generate a set of updated classifier rules to form an updated classifier table.

13. A method for improving a classifier table which correlates vehicle emission test failures with diagnostic assessments of the causes of the failure, said method including utilizing data derived from a plurality of vehicles which had failing emissions tests results and whose owners received a prediction report and wherein each of said plurality of vehicles has particular vehicle characteristics and also has passing emissions test results and a repair report, said method further comprising the steps of:

receiving said vehicle characteristics signals, said failing emission test signals and said passing emission test signals of said plurality of vehicles;

dividing said vehicle characteristics signals and said failing and passing emission test signals of said plurality of vehicles to generate a training dataset and a testing dataset; and correlating said plurality of repair reports with said training dataset to form new rules;

from said new rules, forming new classifiers.

14. A method as recited in claim 13 wherein prior to said dividing step, said method further comprising the steps of:

filtering said vehicle characteristics signals and failing and passing emission test signals of said plurality of vehicles for errors;

formatting said vehicle characteristics signals and failing and passing emission test signals of said plurality of vehicles to be acceptable input for said correlating step; and weighting said vehicle characteristics signals and failing and passing emission test signals of said plurality of vehicles so that each signal is appropriately scaled.

15. A method as recited in claim 13 further comprising the steps of:

processing said testing dataset and said classifier table to form first output;

processing new classifiers to form second output;

comparing first output with said second output to generate a set of updated classifier rules;

forming an updated classifier table.

16. A method as recited in claim 13 further comprising steps for generating a diagnosis of a vehicle's cause of failure of an emissions test:

in a storage media, storing said classifier table composed of a set of rules;

in an emissions testing facility, receiving and storing vehicle characteristics signals;

in said emissions testing facility, sampling emissions of said vehicle to create emission test results to generate a series of emission test signals;

transmitting to a processor said emissions test signals;

transmitting to said processor said vehicle characteristics signal; and comparing said emission test signals and said vehicle characteristics signals to said classifier table's set of rules in a manner in which forms said diagnosis of said vehicle's cause of failure and generating a prediction report thereof.

17. A method as recited in claim 16 further comprising the step of matching said prediction report with a failure frequency distribution file to generate a diagnostic assessment report including failure probabilities.

18. A method as recited in claim 16 further comprising the step of transmitting said diagnostic assessment report to a host computer where it is stored.

* * * * *